United States Patent

Kawakatsu

(10) Patent No.: US 7,694,347 B2
(45) Date of Patent: Apr. 6, 2010

(54) MEASURING DEVICE WITH DAISY TYPE CANTILEVER WHEEL

(75) Inventor: Hideki Kawakatsu, Setagaya-ku (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 381 days.

(21) Appl. No.: 11/577,928

(22) PCT Filed: Oct. 27, 2005

(86) PCT No.: PCT/JP2005/019750

§ 371 (c)(1),
(2), (4) Date: Jun. 1, 2007

(87) PCT Pub. No.: WO2006/046625

PCT Pub. Date: May 4, 2006

(65) Prior Publication Data

US 2009/0138994 A1    May 28, 2009

(30) Foreign Application Priority Data

Oct. 28, 2004 (JP) .............................. 2004-314034

(51) Int. Cl.
*G01N 13/10* (2006.01)
(52) U.S. Cl. ................... 850/21; 850/1; 850/2
(58) Field of Classification Search ............. None
See application file for complete search history.

(56) References Cited

U.S. PATENT DOCUMENTS

| | | | |
|---|---|---|---|
| 6,611,178 B1 * | 8/2003 | Kawakatsu et al. | 331/154 |
| 7,220,962 B2 * | 5/2007 | Kawakatsu | 250/306 |
| 7,297,568 B2 * | 11/2007 | Kawakatsu et al. | 438/52 |
| 2004/0256552 A1 * | 12/2004 | Kawakatsu | 250/306 |
| 2005/0247998 A1 * | 11/2005 | Kawakatsu et al. | 257/531 |
| 2006/0162455 A1 * | 7/2006 | Kawakatsu | 73/579 |
| 2007/0108159 A1 * | 5/2007 | Kobayashi et al. | 216/2 |
| 2007/0140905 A1 * | 6/2007 | Kawakatsu | 422/69 |

(Continued)

FOREIGN PATENT DOCUMENTS

EP    1233259 A1 *    8/2002

(Continued)

*Primary Examiner*—David A Vanore
*Assistant Examiner*—Andrew Smyth
(74) *Attorney, Agent, or Firm*—Oblon, Spivak, McClelland, Maier & Neustadt, L.L.P.

(57) ABSTRACT

A measuring device with a daisy type cantilever wheel enabling easier setting of a measuring head and modification head by rotating the daisy type cantilever wheel, enabling modification, adhesion of a sample, and application of a force to a sample specimen by using centrifugal force, and also enabling an easier measurement of a variation of characteristic vibration frequency and vibration amplitude of a cantilever array is provided.

The measuring device with a daisy type cantilever wheel comprising a disk-like base plate, a cantilever array with cantilevers, the longitudinal axes thereof being arranged approximately in the radial direction of the disk-like base plate, a rotational mean of the disk-like base plate, the cantilever array being arranged thereon, a positioning device of the cantilever array, an optical measuring head arranged in a position corresponding to the cantilever array for measuring the movement of the cantilever, whereby the variations in the vibration frequency and/or the vibration amplitude of the cantilevers are successively detected according to the rotation of the disk-like base plate.

39 Claims, 8 Drawing Sheets

U.S. PATENT DOCUMENTS

| | | | |
|---|---|---|---|
| 2007/0158554 A1* | 7/2007 | Kobayashi et al. | 250/309 |
| 2007/0197176 A1* | 8/2007 | Kobayashi et al. | 455/205 |
| 2008/0088205 A1* | 4/2008 | Kawakatsu | 310/333 |
| 2008/0252385 A1* | 10/2008 | Kawai et al. | 331/25 |
| 2009/0224850 A1* | 9/2009 | Nakamura et al. | 333/186 |

FOREIGN PATENT DOCUMENTS

| | | |
|---|---|---|
| JP | 4 233406 | 8/1992 |
| JP | 4 286908 | 10/1992 |
| JP | 5 18744 | 1/1993 |
| JP | 6 281443 | 10/1994 |
| JP | 7 260802 | 10/1995 |
| JP | 8 211074 | 8/1996 |
| JP | 2003 534141 | 11/2003 |
| JP | 2004 58267 | 2/2004 |
| JP | 2004 125706 | 4/2004 |
| JP | 2004 212078 | 7/2004 |
| WO | 02 25246 | 3/2002 |
| WO | 2004 017019 | 2/2004 |

* cited by examiner

MEASURING DEVICE WITH DAISY TYPE CANTILEVER WHEEL

TECHNICAL FIELD

The present invention relates to a measuring device with a daisy tape cantilever wheel.

BACKGROUND ART

Conventionally, variations of characteristic vibration frequency and vibration amplitude of a cantilever in a cantilever array comprising a plurality of cantilevers have been measured by scanning with an electric sensor or an optical sensor on the cantilevers aligned in a line (see a non patent document 1 below).

Figure 1:
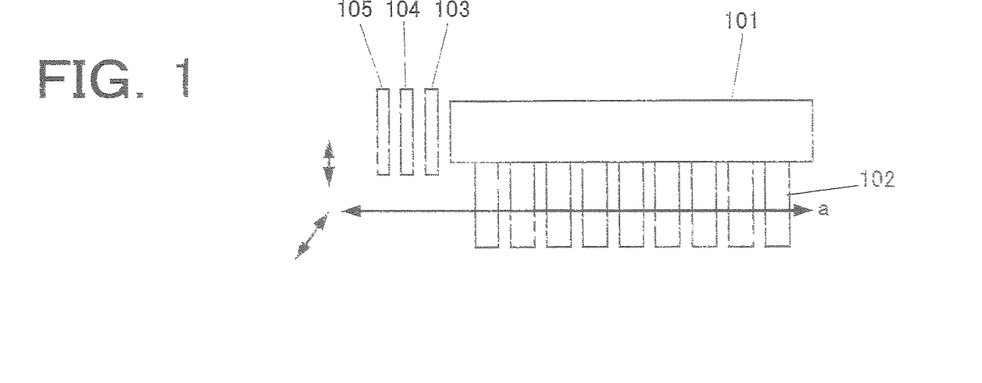
FIG. 1 is a schematic diagram showing a conventional measuring device with in-line cantilevers.

FIG. 1 shows a schematic view of such a measuring device with a series of inline type cantilevers.

In FIG. 1, 101 is a base plate, 102 is a cantilever array in which cantilevers are aligned in a line along the base plate 101, 103 is an optical measuring head driven in the inline direction (a) in order to measure variations of characteristic vibration frequency and vibration amplitude of cantilevers, and 104 and 105 are modification heads for fixing modifier material on the cantilever array 102

In addition, investigations have been carried for the purpose of utilizing each cantilever and/or each probe as a material sensor by modifying each of the cantilever and/or probe with a particular material (see non patent documents 2 and 3 below).

In the investigation disclosed in the non patent document 3, printing of modifier materials on cantilevers is performed by positioning a nozzle of an inkjet printer in a 3-dimensional xyz coordinate.

In addition, non patent documents 4 and 5 disclose methods of modifying cantilevers using an inkjet printer.

Several kinds of measuring methods and devices using several kinds of cantilevers as indicated below have been proposed by the present inventor.

(1) A cantilever array with a simple structure enabling correct detection of a surface of a sample, a fabrication method thereof a scanning probe microscope using therewith, a sliding device of guiding and/or rotating system, a sensor, a homodyne laser interferometer, a laser Doppler interferometer with an optical exciting function of a sample, and a method for exciting a cantilever (see the patent document 1 below).

(2) A cantilever as a micro 3-dimensional structure comprising silicone micro wires, fabrication methods thereof and devices using the cantilever (see the patent document 2 below).

(3) A method and device for measuring vibration of a cantilever in a cantilever array comprising plurality of cantilevers (2-n) mutually having different characteristic vibration frequencies, wherein each characteristic vibration frequency of the cantilevers is successively excited by modulated optical excitation to measure the vibrations by the laser Doppler interferometer (see the patent document 3 below).

Non-patent document 1: Gerhand Grosch, "Hybrid fiber-optic/micromechanical frequency encoding displacement sensor", Sensors and Actuators A, April 1990, Vol. 23, Issues 1-3, pp. 1123-1131.

Non-patent document 2: James C. Mabry, Tim Yau, Hui-Wen Yap, John-Bruce D. Green, "Developments for inverted atomic force microscopy", Ultramicroscopy 91, (2002), pp. 73-82.

Non-patent document 3. M. K. Baller, H. P. Lang, J. Fritz, Ch. Gerber, J. K. Gimzewski, U. Drechsler, H. Rothuizen, M. Despont, P. Vettiger, F. M. Battiston, J. P. Ramseyer, P. Fornaro, E. Meyer, and H.-J. Guentherodt: "A cantilever array-based artificial nose", Ultramicroscopy, 87(1-4), (2000), pp. 1-9.

Non-patent document 4: Bietsch A, Zhang J Y, Hegner M, Lang H P, Gerber C; "Rapid functionalization of cantilever array sensors by inkjet printing", NANOTECHNOLOGY 15(8) August 2004, pp. 873-880.

Non-patent document 5: Bietsch A, Hegner M, Lang H P Gerber C; "inkjet deposition of alkanethiolate monolayers and DNA oligonucleotides on gold: Evaluation of spot uniformity by wet etching", LANGMUIR 20(12) Jun. 8, 2004, pp. 5119-5122.

Patent document 1: Japanese Patent Application Publication No. 2003-114182.

Patent document 2: WO 03/102549 A1

Patent document 3: WO 2004/061427 A1

DISCLOSURE OF INVENTION

However, in the measuring method and device disclosed in the non-patent document 13 cantilevers are aligned in a line and an optical measuring head is driven in a linear direction Accordingly, it is necessary to have optical scanning devices such as a mirror scanner, galvano scanner, and a polygon mirror and a linear moving mechanical displacement mechanism in the method and device.

In addition, the measuring methods and devices disclosed in the non-patent documents 2 and 3 require a 3-dimensional xyz positioning mechanism for an inkjet printer that is used for inkjet printing of modifier material onto cantilevers and high positioning of the inkjet printer must be performed by the 3-dimensional xyz positioning mechanism.

As described above, in the conventional measuring methods and devices, there is a problem in that a displacement mechanism of a measuring head and modification head becomes complex.

Considering the above described situation, the present invention proposes a measuring device with a daisy type cantilever wheel structure, wherein an easy setting of a measuring head and a modification head is realized by rotating the daisy type cantilever wheel as well as modification, adhesion of a sample, and application of a force to a sample are realized by using centrifugal force brought about by the rotation of the daisy type cantilever array, whereby an easy measurement of variations of characteristic vibration frequency and vibration amplitude of a cantilever array is realized.

[1] In order to achieve the above described object, the present invention provides a measuring device with a daisy type cantilever wheel comprising a disk-like base plate, a cantilever array with cantilevers longitudinal axes thereof being arranged approximately in the radial direction of the disk-like base plate, a rotational means of the disk-like base plate on which the cantilever array is arranged, a positioning device of the cantilever array, and an optical measuring head arranged in a position corresponding to the cantilever array for measuring movement of the cantilever, whereby the variations in the vibration frequency and/or vibration amplitude of the cantilevers are successively detected according to the rotation of the disk-like base plate.

[2] The measuring device with a daisy type cantilever wheel described in [1] is characterized in that an excess material adhered to the cantilever is removed by using the centrifugal force brought about by the rotation of the rotational means.

[3] The measuring device with a daisy type cantilever wheel described in [1] is characterized in that a device for fixing a modifier material on the cantilever is provided.

[4] The measuring device with a daisy type cantilever wheel described in [3] is characterized in that the device for fixing a modifier material is positioned with respect to a rotating cantilever array and successively performs modification of the cantilevers according to the rotation of the disk-like base plate.

[5] The measuring device with a daisy type cantilever wheel described in [3] is characterized in that the device for fixing a modifier material is a dropping device of the modifier material.

[6] The measuring device with a daisy type cantilever wheel described in [3] is characterized in that a modification head of the device for fixing a modifier material is an inkjet printer.

[7] The measuring device with a daisy type cantilever wheel described in [3] is characterized in that a modification head of the device for fixing a modifier material is a modified cantilever.

[8] The measuring device with a daisy type cantilever wheel described in [3] is characterized in that a modification head of the device for fixing a modifier material is a device for the deposition of a gaseous material in the atmosphere induced by an electron beam.

[9] The measuring device with a daisy type cantilever wheel described in [1] is characterized in that the cantilever is coated in the longitudinal direction thereof with the dropped material or sprayed material on the disk-like base plate and cantilever by using the centrifugal force brought about by the rotation of the disk-like base plate.

[10] The measuring device with a daisy type cantilever wheel described in [1] is characterized in that the device for fixing a modifier material is equipped with a feeder of a modifier material arranged on the disk-like base plate and a guiding groove connecting the feeder of a modifier material with the cantilever.

[11] The measuring device with a daisy type cantilever wheel described in [10] is characterized in that a plurality of the feeders of a modifier material are arranged and a same or a different modifier material is set in each of the plurality of the feeders of a modifier material whereby a same or different modification is made to each of the plurality of the cantilevers.

[12] The measuring device with a daisy type cantilever wheel described in [11] is characterized in that the modifier material is transferred to the tip of the cantilever by using the centrifugal force brought about by the rotation of the disk-like base plate.

[13] The measuring device with a daisy type cantilever wheel described in [11] is characterized in that the modifier material is led to a particular cantilever by a capillary phenomenon or an electrowetting phenomenon in the guiding groove.

[14] The measuring device with a daisy type cantilever wheel described in [4] is characterized in that a displacement device is provided to displace the cantilever array in upper and lower directions, and that a table at which the modifier material is arranged and with which the tip of the cantilever comes into contact according to the rotation of the disk-like base plate is provided.

[15] The measuring device with a daisy type cantilever wheel described in [1] is characterized in that a displacement device is equipped to displace the cantilever array in upper and lower directions and whereby the probe tip of the cantilever comes into contact with a specified position of a set sample successively to collect the material on the surface of the sample.

[16] The measuring device with a daisy type cantilever wheel described in [14] and [15] is characterized in that the displacement device is comprised of a cam.

[17] The measuring device with a daisy type cantilever wheel described in [14] and [15] is characterized in that the displacement device is characterized by using an optical heating.

[18] The measuring device with a daisy type cantilever wheel described in [14] and [15] is characterized in that the displacement device is characterized by using an electric current heating.

[19] The measuring device with a daisy type cantilever wheel described in [14] and [15] is characterized in that the displacement device is characterized by using an electrostatic force.

[20] The measuring device with a daisy type cantilever wheel described in [15] is characterized in that the quantity of the material collected from the surface of the sample is a very small amount ranging from one atom or one molecule to a few picograms.

[21] The measuring device with a daisy type cantilever wheel described in [20] is characterized in that the very small amount of the material collected (including one atom) by the probe tip of the cantilever is mass analyzed by means of a time of flight method.

[22] The measuring device with a daisy type cantilever wheel described in [20] is characterized in that after a mass analysis of the very small amount of the material collected by (including one atom) the probe tip of the cantilever is performed by means of a time of flight method, a residual sample specimen is removed from the probe tip by means of applying an electric field on the probe tip and specimen from the sample is collected again by the cleaned probe tip according to the rotation of the daisy type cantilever wheel, and that the steps of sample collection, measurement by a time of flight method, and cleaning the probe tip are repeated.

[23] The measuring device with a daisy type cantilever wheel described in any one of above [20] to [22] is characterized in that an In-plane raster scan of a solid sample is performed, and the position with which the probe tip of the cantilever comes into contact is successively swept, and specimens and atoms located in different positions on the solid sample are successively collected.

[24] The measuring device with a daisy type cantilever wheel described in [23] is characterized in that high resolution mapping of the distribution of the chemical element composition on the surface of the sample is performed by a time of flight mass analysis and chemical element identification of the specimens collected from different positions of the sample.

[25] The measuring device with a daisy type cantilever wheel described in [1] or [3] is characterized in that a device for feeding a sample to the cantilever is equipped therewith.

[26] The measuring device with a daisy type cantilever wheel described in [25] is characterized in that the device for feeding a sample is equipped with a feeder of a sample arranged on the disk-like base plate and a guiding groove connecting the feeder of a sample with the cantilever.

[27] The measuring device with a daisy type cantilever wheel described in [26] is characterized in that a plurality of the feeders of a sample are arranged thereon and a same or a different sample is set in each of the plurality of the feeders of a sample, and a same or a different sample is adhered to each of the plurality of the cantilevers.

[28] The measuring device with a daisy type cantilever wheel described in [11] is characterized in that the sample is led to a particular cantilever by a capillary phenomenon or an electrowetting phenomenon in the guiding groove.

[29] The measuring device with a daisy type cantilever wheel described in [1] is characterized in that a displacement device is provided to displace the cantilever array in upper and lower directions, and that a table at which the sample is arranged and with which the probe tip of the cantilever comes into contact according to the rotation of the disk-like base plate is provided.

[30] The measuring device with a daisy type cantilever wheel described in [3] is characterized in that samples are detected by a selective setting of a modifier material fixed on the cantilever.

[31] The measuring device with a daisy type cantilever wheel described in [1] is characterized in that the cantilever array is divided into a plurality of cantilever sets with different characteristic vibration frequency band and a different sample is detected at the each frequency band by changing the modifier material corresponding to the frequency band.

[32] The measuring device with a daisy type cantilever wheel described in [1] or [3] is characterized in that the cantilever is a V-shaped cantilever.

[33] The measuring device with a daisy type cantilever wheel described in [1] or [3] is characterized in that the cantilever is a loop type cantilever.

[34] The measuring device with a daisy type cantilever wheel described in [33] is characterized in that a modifier material in the form of a thin film IS spread on the loop type cantilever.

[35] The measuring device with a daisy type cantilever wheel described in [34] is characterized in that a sample is captured on the modifier material in the form of a thin film.

[36] The measuring device with a daisy type cantilever wheel described in [10] is characterized in that the guiding groove of the solution of a modifier material and the cantilever connected therewith are designed so as to form a curve in the horizontal direction, taking into account the rotational inertia of the disk-like base plate.

[37] The measuring device with a daisy type cantilever wheel described in [26] is characterized in that the guiding groove of the sample solution and the cantilever connected therewith are designed so as to form a curve in a horizontal plane, taking into account the rotational inertia of the disk-like base plate.

[38] The measuring device with a daisy type cantilever wheel is characterized in that reaction binding and the binding strength between the modifier material fixed on the cantilever or probe according to any of above [5] to [14] and the sample adhered to the cantilever or probe according to above [16] [25] or [29] are detected as the variations of the mechanical properties of the cantilever and the variations of the optical properties of the surface of the cantilever.

[39] A measuring device with a daisy type cantilever wheel is characterized in that a process ranging from an atomic level to an order of several nanometers of a surface of a solid sample is performed by using the measuring device with a daisy type cantilever wheel described in [1].

BEST MODE FOR CARRYING OUT THE INVENTION

In the present inventions cantilevers are arranged in the form of a daisy type wheel (approximately radial form) and a daisy type cantilever wheel and a cantilever array are rotated by means of a spindle. Such configuration of the present invention enables measurement of the characteristic vibration frequency and vibration amplitude of the cantilever as well as the modification and measurement of samples by rotating the wheel without large scale scanning of the measuring head and/or modification head.

DESCRIPTION OF THE PREFERRED EMBODIMENTS

Embodiments of the present invention are described below referring to the corresponding drawings.

Figure 2:
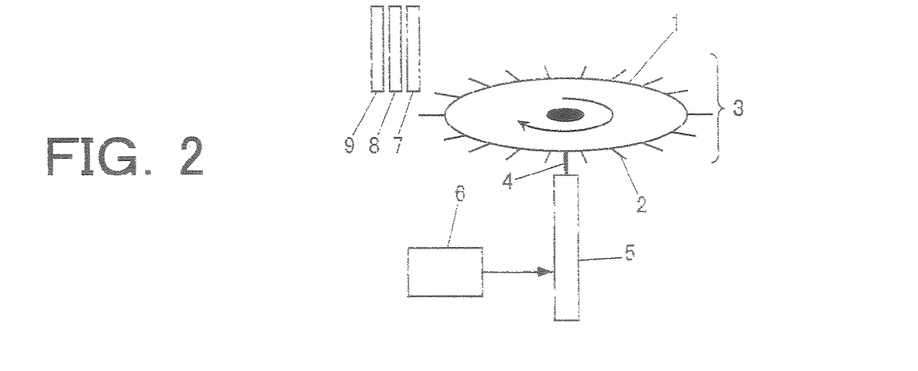
FIG. 2 is a schematic diagram showing a basic configuration of a measuring device with a daisy type cantilever wheel according to the present invention.

FIG. 2 shows a basic configuration of a measuring device with a daisy type cantilever wheel in accordance with the present invention.

In this figure, 1 is a daisy type cantilever wheel, 2 is a cantilever being arranged so that the longitudinal axis coincides with the radial direction of the cantilever wheel, and 3 is a cantilever array comprising a plurality of cantilevers 2. 4 is a rotating shaft of the wheel 1, 5 is a rotational driving unit of the wheel 1 (a spindle or the like), 6 is a control unit including a positioning function of the rotational driving unit 5, 7 is an optical measuring head, and 8 and 9 are modification heads.

As shown in this figure, a plurality of cantilevers 2 being arranged so that the longitudinal axis coincides with the radial direction of the cantilever wheel are attached to the cantilever wheel 1, and the wheel 1 is capable of rotating by the rotational driving unit 5. In addition, the cantilever 2 attached to the wheel 1 is correctly positioned by the control unit 6.

According to such configuration of the present invention, the characteristic vibration frequency and vibration amplitude of the cantilever 2 can be measured by rotating the wheel 1 and appropriately positioning the cantilever 2, optical measuring head 7 and modification heads 8 and 9 without large scale scanning of the optical measuring head 7, and the modification heads 8 and 9.

Since an excess material adhered to the cantilever 2 is removed by dispersion due to the rotation of wheel 1, the net measured data of the characteristic vibration frequency and vibration amplitude of the cantilever, that is, the precise measured data of the characteristic vibration frequency and vibration amplitude of the cantilever can be obtained.

In addition, the modifier material to be used for modification of the cantilever 2 can be supplied from the modification heads 8 and 9 to the cantilever 2 by using the centrifugal force brought about by the rotation of the wheel 1. At this time, using the centrifugal force brought about by the rotation of the wheel 1 it is possible to adhere a target modifier material having a strong adhesive force only to the cantilever 2 by dispersing other excess materials having a weak adhesive force from the cantilever 2.

Figure 3:
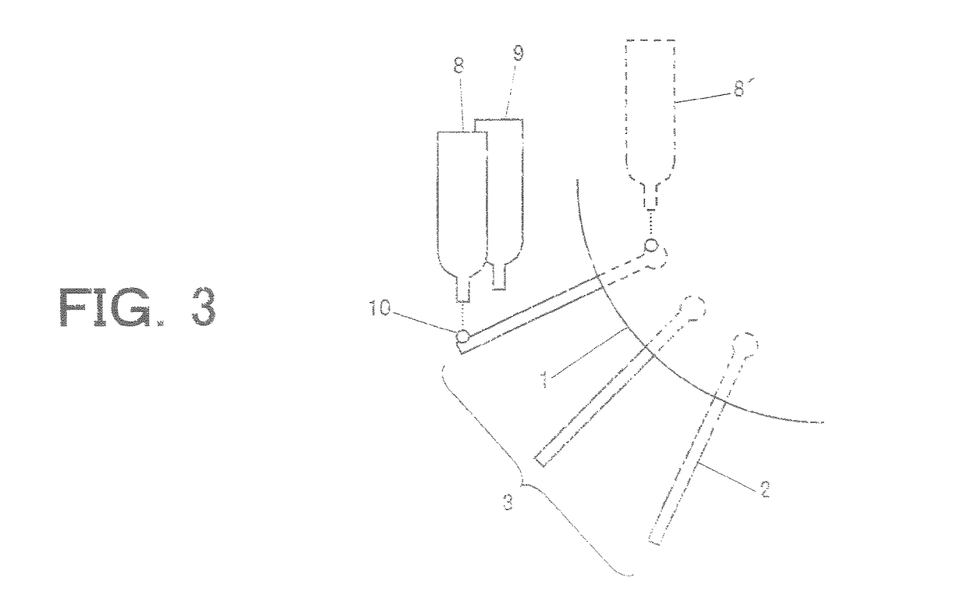
FIG. 3 is a schematic diagram wherein a dropping device of liquid drops is used as a modification head in accordance with an embodiment of the present invention.

Here, for example as shown in FIG. 3 the modification heads 8 and 9 as devices for fixing a modifier material are dropping devices of liquid drops and direct or indirect coating of the cantilever 2 is performed with the modifier material 10 dropped from these modification heads 8 and 9. Alternatively arranging the modification head 8 just above the wheel 1 it is possible to lead the modifier material 10 dropped onto the wheel 1 to the cantilever 2 by using the centrifugal force due to the rotation of the wheel 1.

Figure 4:
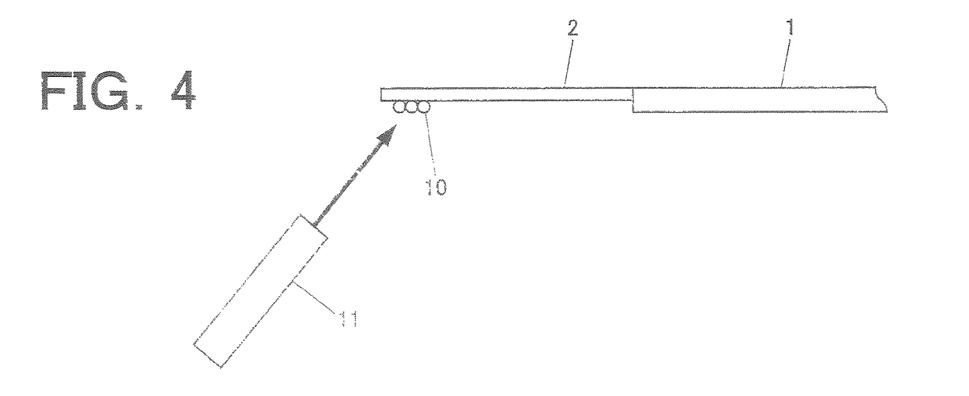
FIG. 4 is a schematic diagram wherein an ink et printer arranged obliquely under a cantilever attached to the wheel is used as a modification head in accordance with an embodiment of the present invention.

In addition, as shown in FIG. 4, it is also possible to coat the cantilever 2 with a modifier material using an inkjet printer 11 arranged obliquely under the cantilever 2 attached to the wheel 1.

Figure 5:
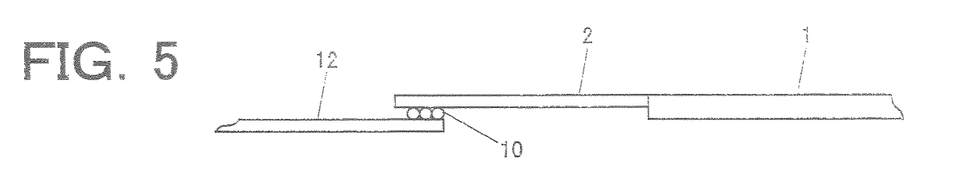
FIG. 5 is a schematic diagram wherein a modified cantilever is used as a modification head in accordance with an embodiment of the present invention.

FIG. 5 shows when a modified cantilever is used as a modification head functioning as a device for fixing modifier materials. In this configuration, coating the cantilever 2 attached to the wheel 1 with the modifier material 10 is performed by means of the modification head 12 comprised of a modified cantilever.

Figure 6:
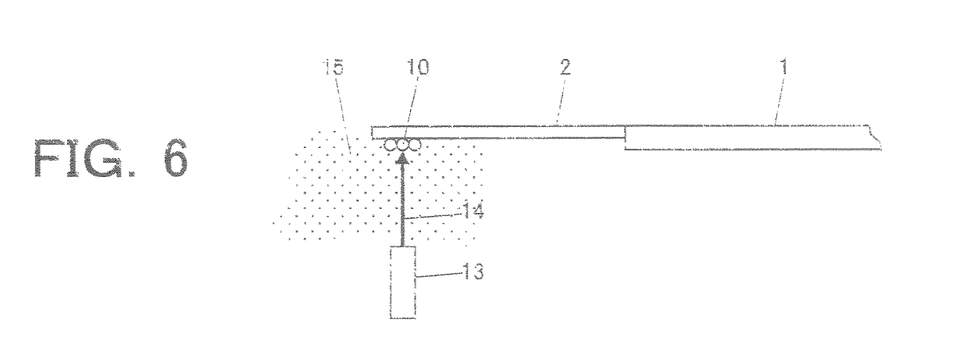
FIG. 6 is a schematic diagram wherein a device for the deposition of a gaseous material in the atmosphere induced by an electron beam is used as a modification head in accordance with an embodiment of the present invention.

FIG. 6 shows an example when a device for deposition of a gaseous material in the atmosphere induced by an electron beam is used as a modification head functioning as a device for fixing modifier materials. Here, a floating material 15 in a gas phase in the vicinity of the cantilever 2 is deposited on the cantilever 2 as a modifier material 10 by irradiating an electron beam 14 from an electron beam nozzle 13

Next, an example of coating the cantilever 2 in the longitudinal direction with the material dropped or sprayed on the wheel 1 and the root of the cantilever 2 by using the centrifugal force brought about by rotating the wheel 1 is explained.

Figure 7:
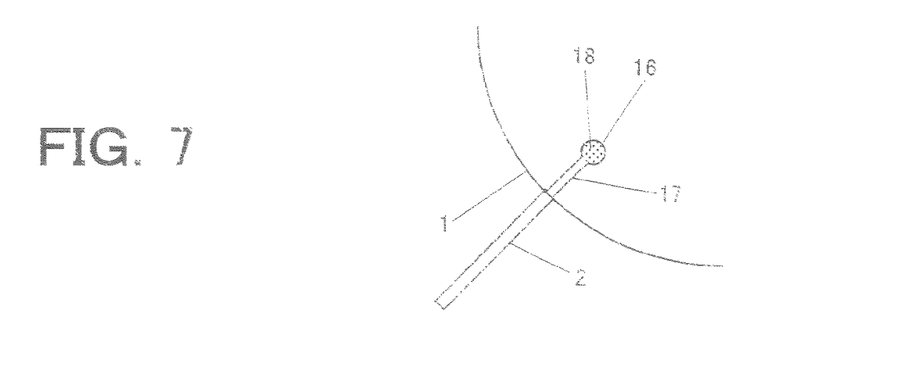
FIG. 7 is a profile showing a case when a device for fixing a modifier material is a liquid reservoir of the modifier material (a feeder of the modifier material) formed on the wheel in accordance with an embodiment of the present invention.

In FIG. 7, the device for fixing modifier materials is a liquid reservoir for modifier materials (a feeding unit of modifier materials) 16 formed on the wheel 1, and the solution of modifier material 18 is led to the cantilever 2 through the guiding groove 17 fabricated on the wheel 1, which connects the liquid reservoir for modifier materials 16 with the cantilever 2. That is to say, the cantilever 2 is coated in the longitudinal direction with the solution of modifier material 18 existing in the liquid reservoir for modifier materials 16 through the guiding groove 17 by using the centrifugal force brought about by the rotation of the wheel 1. At this time, the cantilever 2 can be coated only with the solution of a modifier material 18 by removing an excess material previously adhered to the cantilever 2 by using the centrifugal force brought about by the rotation of the wheel 1.

Figure 8:
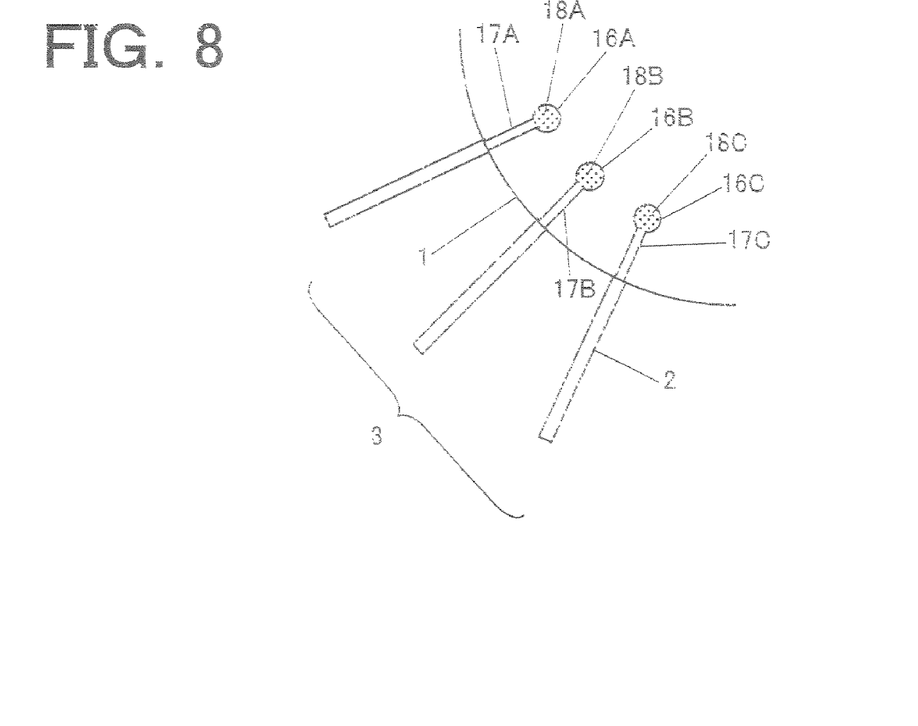
FIG. 8 is a schematic diagram showing an example of arranging a plurality of the liquid reservoirs in accordance with an embodiment of the present invention.

In addition, as shown in FIG. 8, it is possible to coat each of the cantilevers 2 with different solutions of the modifier materials 18A, 18B, 18C . . . existing in a plurality of liquid reservoirs for modifier materials 16A, 16B, 16C . . . through a plurality of guiding grooves 17A, 17S, 17C . . . .

Figure 9:
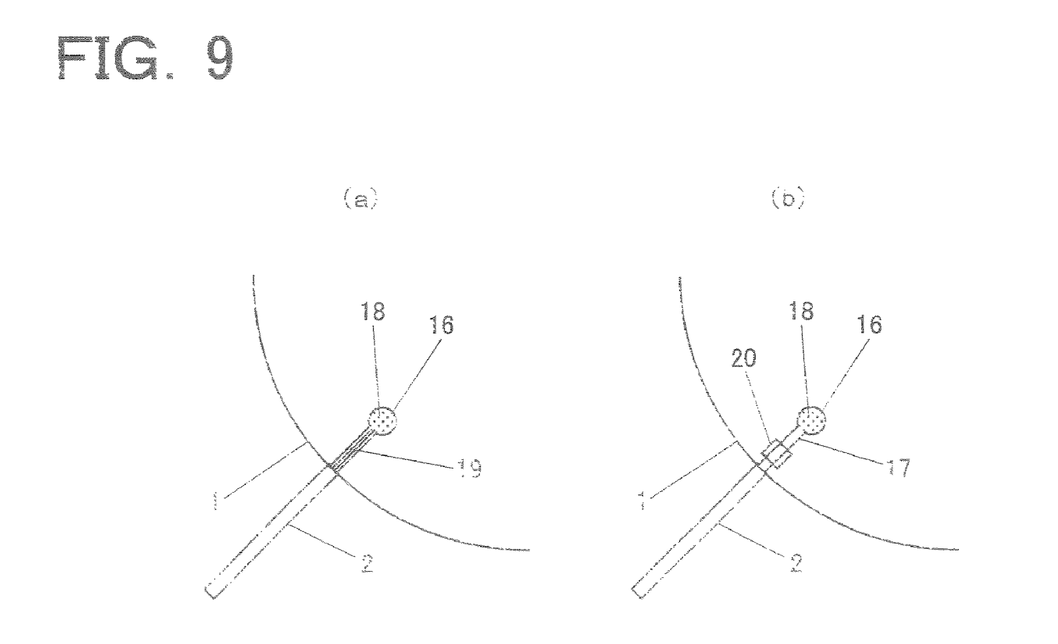
FIG. 9 is a schematic diagram showing other transfer modes of modifier materials in accordance with an embodiment of the present invention.

Furthermore, as shown in FIG. 9, it is possible to lead the solution of a modifier material 18 to a particular cantilever by using a capillary phenomenon 19 [FIG. 9(a)] and/or an electrowetting 20 [FIG. 9(b)] in the guiding groove 17 described above.

Figure 10:
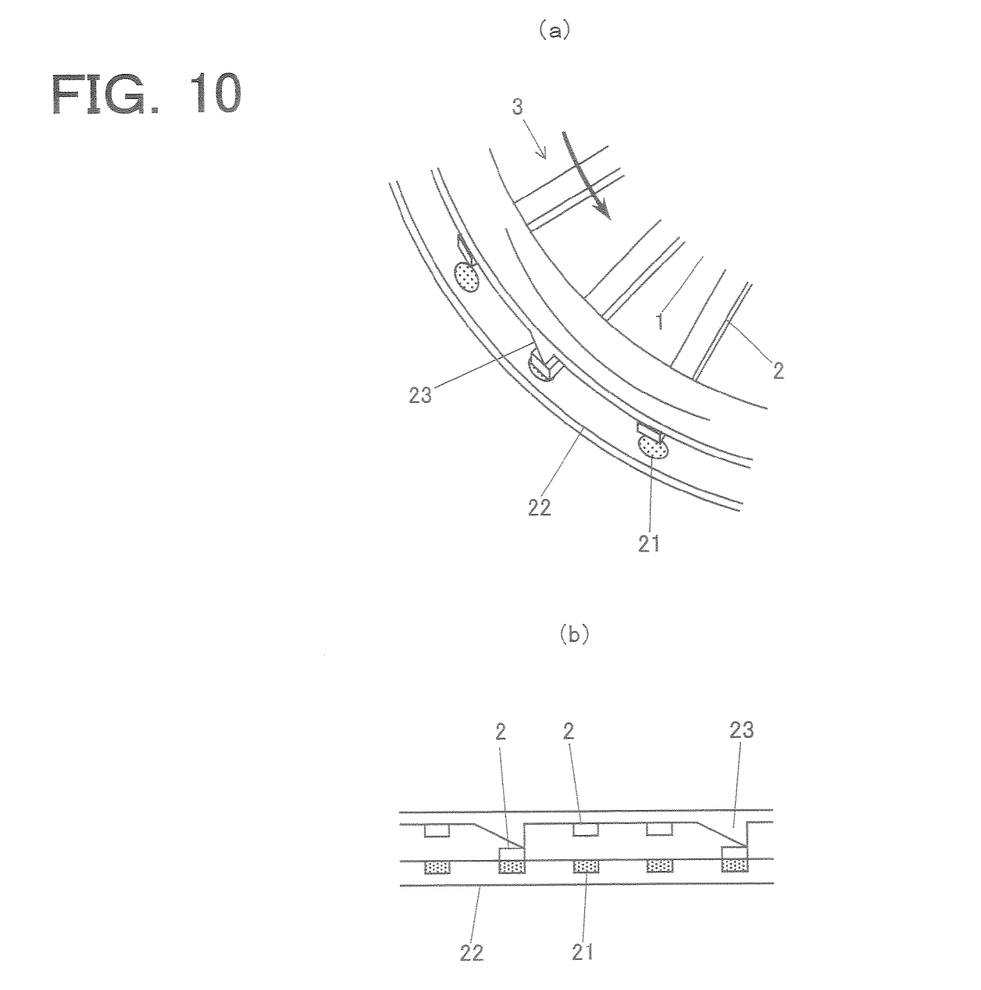
FIG. 10 is a schematic diagram of a device for fixing a modifier material in combination with a displacement device of a cantilever array in accordance with an embodiment of the present invention.

FIG. 10 shows an example when a modifier material is fixed on a cantilever by selectively contacting the cantilever with the modifier material set in/on a setting unit of the modifier materials arranged under the cantilever.

As shown in these figures, the table 22 to which the modifier material 21 attached is placed under the cantilever array 3, and the cam 23 which is capable of displacing the cantilever array in upper and lower directions is placed above the cantilever array 3, and the cantilever 2 is displaced in upper and lower directions by using the cam 23 according to the rotation of the wheel 1, and then the cantilever 2 comes into contact with the table 22 to which the modifier material 21 is attached and then the modifier material 21 is fixed on the cantilever 2. It is possible to put the cam 23 and table 22 in a separate position from the cantilever 2 at the time of measurement after fixing the modifier material 21 on the cantilever 2. It is also possible that each cantilever 2 comes into contact selectively with the modifier material 21, by shifting table 22 with an appropriate rotation angle.

Next, a measuring method comprising steps of: adhering a sample (materials, novel drugs and cells, or the like) to the cantilever from a device for feeding a sample after fixing or without fixing a modifier material to the cantilever; performing measurement of the characteristic vibration frequency and vibration amplitude of the cantilever having the adhered samples by scanning it with an optical measuring head; and performing measurement of the sample by detecting the difference between the characteristic vibration frequency and vibration amplitude of the cantilever without the adhered samples and those of the cantilever having the adhered samples.

Figure 11:
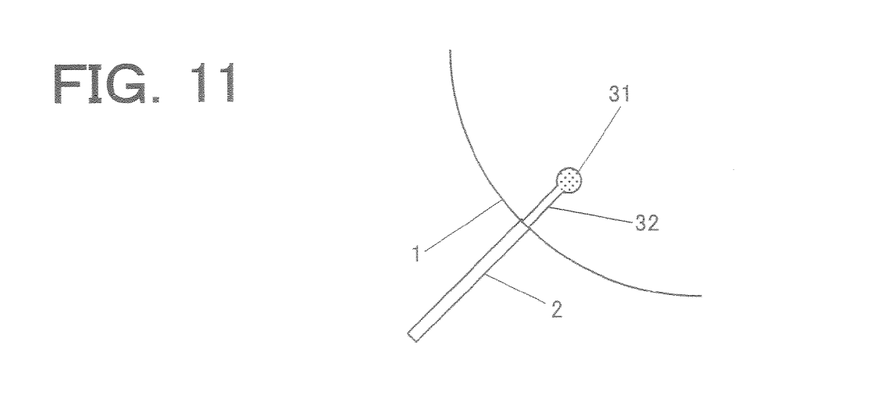
FIG. 11 is a schematic diagram showing a method that a sample to be measured is directly fed to a cantilever after fixing or without fixing modifier material on the cantilever in accordance with an embodiment of the present invention.

FIG. 11 is a schematic diagram showing a method of feeding a sample to a cantilever after fixing a modifier material on the cantilever or feeding a sample directly on the cantilever without any modifier materials.

Here, a liquid reservoir for sample solution (sample feeding part) 31 is arranged on a wheel 1 as a device for feeding a sample, and the sample solution is led to the cantilever 2 through the guiding groove 32 formed on the wheel 1 connecting the liquid reservoir for the sample solution with the cantilever 2.

In this case also, the sample solution is fed from the liquid reservoir for sample solution 31 to a cantilever 2 through the guiding groove 32 by using the centrifugal force brought about by the rotation of the wheel 1 Of course, the impurities previously attached to the cantilever 2 can be dispersed out by the centrifugal force. As described above, it is desirable to fix a modifier material before adhesion of a sample.

In this way, a sample is easily adhered to the cantilever 2.

Figure 12:
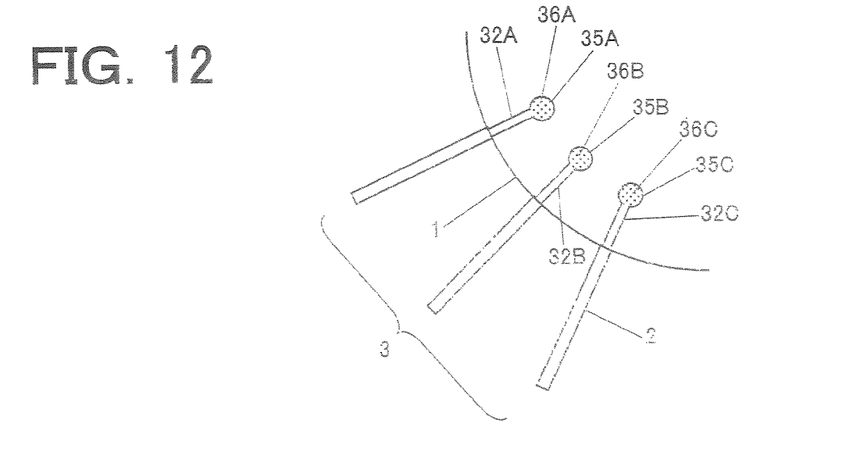
FIG. 12 is a schematic diagram showing that a plurality of devices for feeding samples is arranged in accordance with an embodiment of the present invention.

In addition, as shown in FIG. 12, it is possible to coat each of the cantilever 2 with different samples through a plurality of guiding grooves 32A, 32B, 32C . . . by arranging a plurality of devices for feeding samples and setting different sample solutions 36A, 36B, 36C . . . in the plurality of sample feeding parts 35A, 35B, 35C . . . . Sample solutions can be directly dropped on the cantilevers or supplied to the cantilevers by other various methods.

Furthermore, in a similar way to fix a modifier material as shown in FIG. 9 it is possible to lead a sample solution to a particular cantilever through a guiding groove by using a capillary phenomenon and/or an electro wetting.

Figure 13:
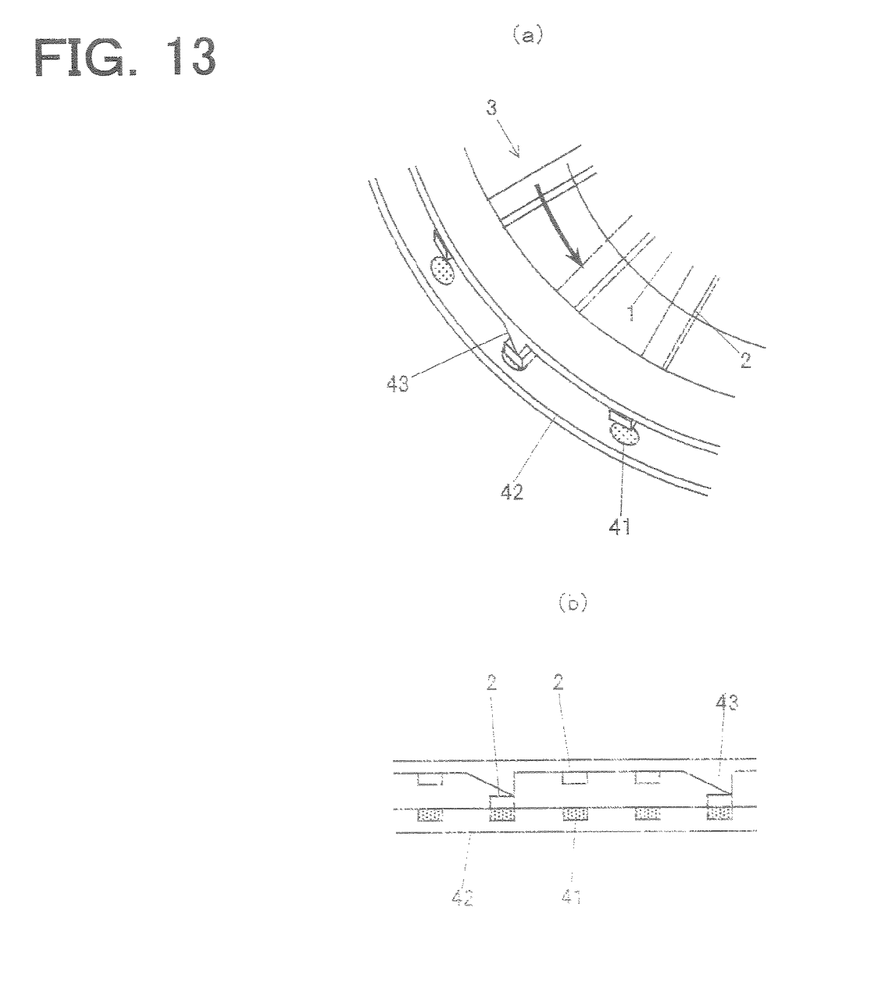
FIG. 13 is a schematic diagram showing a device for feeding a sample to be measured in combination with a displacement device of a cantilever array in accordance with an embodiment of the present invention.

FIG. 13 shows an example when a sample is supplied to a cantilever by selectively contacting the cantilever with the sample set in/on a table for samples arranged under the cantilever.

As shown in this figure, the table 42 in/on which the sample 41 is set is placed under the cantilever array 3, and the cam 43 which is capable of displacing the cantilever array in upper and lower directions is placed above the cantilever array 3, and the cantilever 2 is displaced in upper and lower directions by using the cam 43 according to the rotation of a wheel 1, and then the cantilever 2 comes in contact with the table 42 in/on which the sample 41 is set, and the sample 41 is adhered to the cantilever 2. It is possible to put the cam 43 and table 42 in a separate position from the cantilever 2 at the time of measurement after the adhesion of the sample 41 to the cantilever 2. It is also possible that each cantilever 2 comes into contact selectively with the sample 41, by shifting the table 42 with an appropriate rotation angle.

In this way, detection of a target sample of each cantilever can be performed by setting a sample on the cantilever and by selectively adhering the sample thereto.

It is also possible to divide the cantilever array into a plurality of cantilever sets each of the sets having different characteristic vibration frequency bands, whereby different samples are detected at the each frequency by changing the modifier materials corresponding to the frequency bands.

Figure 14:
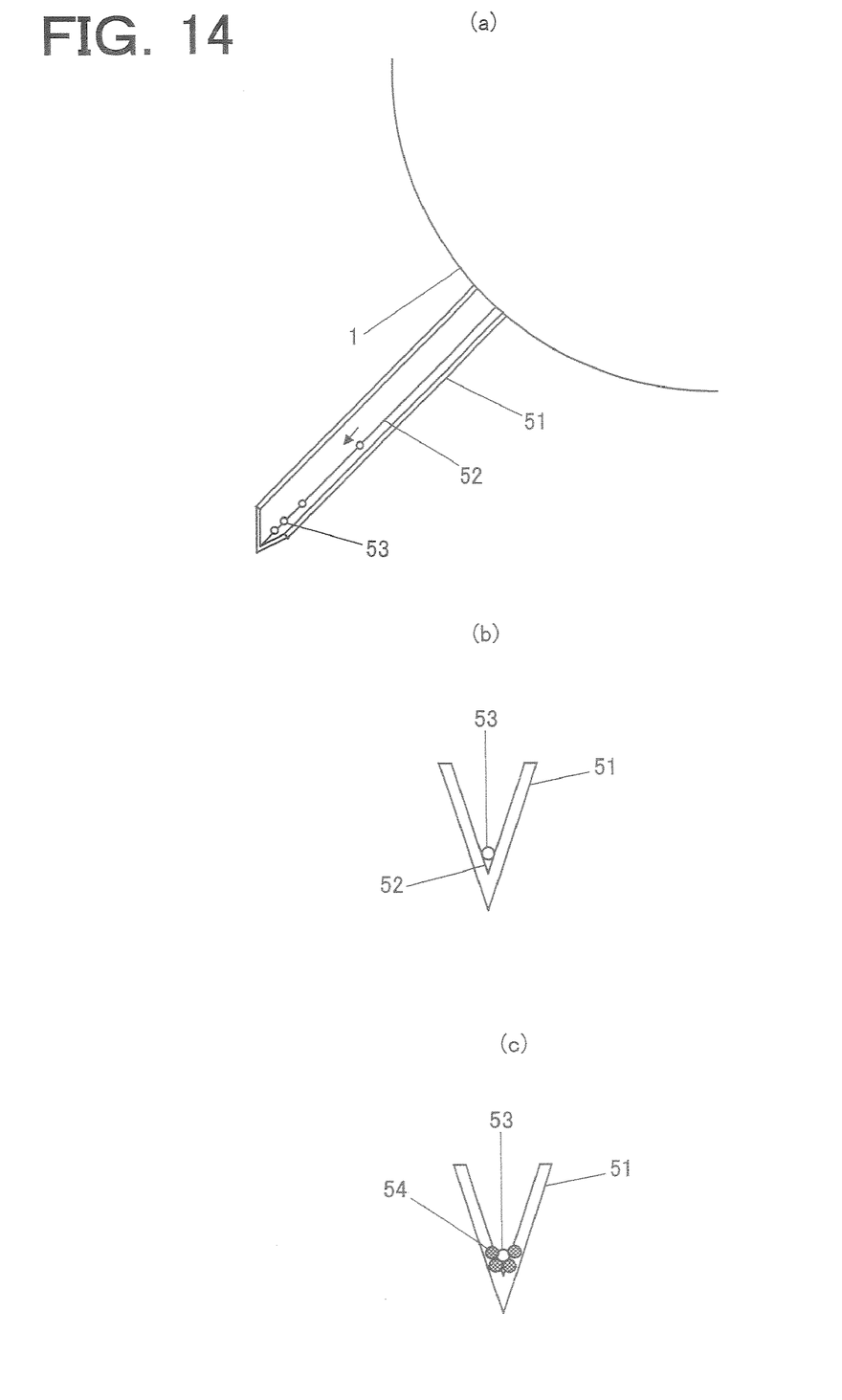
FIG. 14 is a schematic diagram showing a measuring device wherein a V-shaped cantilever is used in accordance with an embodiment of the present invention.

FIG. 14 shows a case when a V-shaped cantilever is used in the measuring device with a daisy type cantilever wheel of the present invention.

By this structure, the modifier material 53 can be transferred to the V-shaped cantilever 51 through the V-shaped art 52. The modifier material 53 can be smoothly transferred to the tip of the cantilever 51 with the rotation of a wheel 1.

In addition, the sample 54 can be adhered to the modifier material 53.

Figure 15:
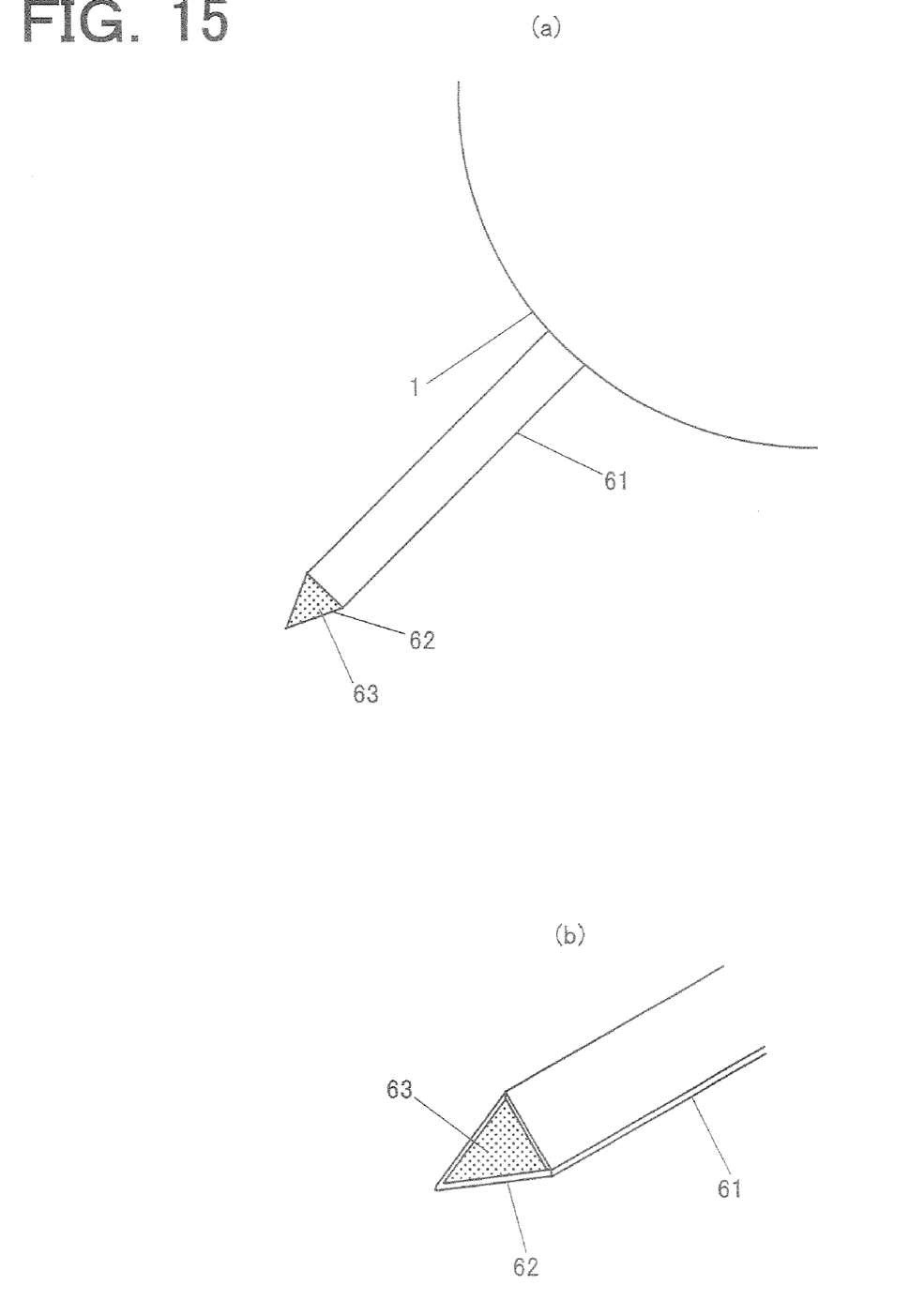
FIG. 15 is a schematic diagram of a measuring device wherein a loop shaped wire is formed on the tip of the cantilever in accordance with an embodiment of the present invention.

FIG. 15 is a schematic diagram showing the measuring device with a cantilever wherein a loop type wire is formed at the top part of the cantilever in accordance with an embodiment of the present invention FIG. 15(*a*) is a plan view of the structure and FIG. 15(*b*) is a perspective view of an enlarged part of the top part of the cantilever at which the loop type wire is formed.

As shown in this figure, the loop type wire 62 crossing at the tip of the cantilever 61 is provided to the top part of the cantilever 61, and the modifier material 63 can be spread in the form of a thin film using the loop type wire 62. The structure of the cantilever with a loop type wire is disclosed in the above described patent document 2 proposed by the present inventor.

In addition, a sample can be captured on the above described thin film consisting of the modifier material 63 and measured.

Figure 16:
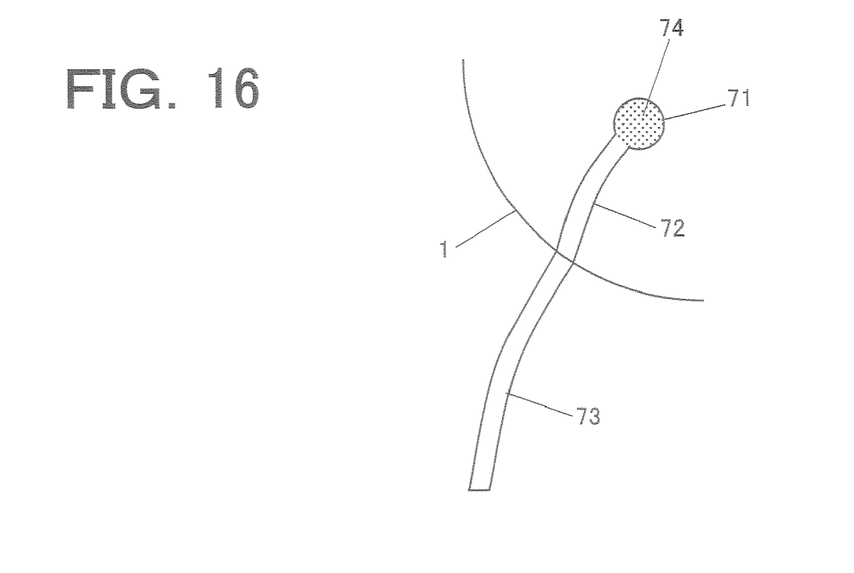
FIG. 16 is a schematic diagram showing an example of modifications of a daisy type cantilever wheel in accordance with the present invention.

FIG. 16 is a schematic diagram showing the measuring device with a daisy type cantilever wheel in accordance with another embodiment of the present invention.

The liquid reservoir for a modifier material 71 is formed on the wheel 1, and the guiding groove 72 curved in the horizontal direction of the wheel 1 is connected with the liquid reservoir for a modifier material 71 and the cantilever 73 curved in the horizontal direction of the wheel 1 is formed so as to be connected with the guiding groove 72. The reason that the guiding groove 72 and cantilever 73 are curved is to realize smooth guiding of the modifier material 74 on the ground that the trajectory of the transfer movement of the modifier material 74 becomes a curved shape in that the modifier material 74 is guided in the radial direction from the center of the wheel 1 as the wheel rotates clockwise by the centrifugal force, while the same is simultaneously guided in the tangential direction by the rotational inertia operating anticlockwise. The root of the cantilever 73 is desirable to be extended in the vertical direction against the wheel 1.

Figure 17:
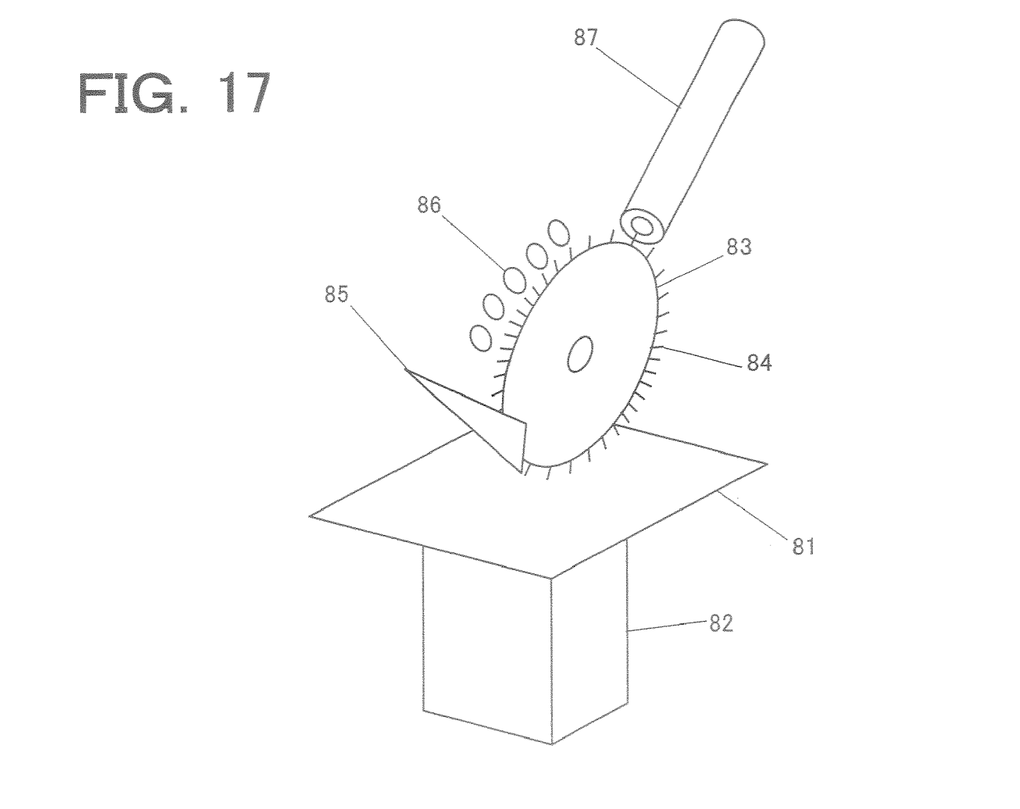
FIG. 17 is a schematic diagram showing a measuring device with a daisy type cantilever wheel in combination with a time of flight (TOF) apparatus in accordance with another embodiment of the present invention.

FIG. 17 is a schematic diagram showing a measuring device with a daisy type cantilever wheel in combination with a time of flight (TOF) measurement in accordance with another embodiment of the present invention.

In this figure, 81 is a table at which a solid sample is set, 82 is a xyz scanner of the table 81, 83 is a daisy type cantilever wheel capable of rotating, 84 is a cantilever having a probe, 85 is a cam as a displacement device of the cantilever having a probe 84, 86 is a group of electrodes for applying electric field to clean the probe, and 87 is a TOF apparatus. As the displacement device of the cantilever having a probe 84, instead of the cam 85, a displacement device using an optical heating, a displacement device using an electric current heating, or a displacement device using an electrostatic force can be used as alternatives, even though they are not shown in the figure. In the case of the displacement device using an optical heating, the cantilever having a probe 84 is displaced by irradiating light thereon. In the case of the displacement device using an electric current heating, the cantilever with a probe 84 is displaced by directly conducting an electric current thereto or by conducting an electric current in the vicinity of the cantilever having a probe 84 to heat indirectly there. In addition, in the case of the displacement device using an electrostatic force, the cantilever having a probe 84 is displaced by operating an electrostatic force between the cantilever having a probe 84 and a specimen standing in the opposite side thereof.

In this way a displacement device capable of displacing a cantilever array in upper and lower directions is equipped and materials on the sample surface can be collected by successive contact of the prove tip of the cantilever 84 with a specified position of the set sample.

In this case, the material quantity collected from the sample surface is a very small amount ranging from one atom or one molecule to a few picograms.

In addition, it is possible to perform mass analysis of said small amount of material (including the case of one atom) collected by the prove tip by means of a time of flight method using the time of flight (TOF) apparatus 87 arranged in the vicinity of the cantilever 84.

In this FIG. 17, after the mass analysis of the small amount of material (including the case of one atom) collected by the prove tip is performed by means of a time of flight method, an electric field is applied to the prove by the group of electrodes for applying electric field to clean the probe 86 to remove a sample specimen remained on the probe tip, and the cleaned probe collects a specimen from the sample again. Thus, the process of collection, the time of flight measurement, and the cleaning is repeated.

Representative prior art examples disclosing combination use of a TOF and probe microscope are as follows;

(A) Dong Weon Lee, Adrian Wetzel, Ronald Benewitz, Ernst Meyer, Michel Despont, Peter Vettiger, Cheistoph Cerber; Switchable cantilever for a time of flight scanning force microscope, APPLIED PHYSICS LETTERS, Vol. 84, No. 9, 1 Mar. 2004, pp. 1558-1560.

(B) O. Nishikawa et al.; Development of a scanning atom probe and atom-by-atom mass analysis of diamonds Appl. Phys., A, 66, pp. S11-S16, Part 1 Suppl. S, March (1998).

(C) O. Nishikawa et al; Atomic Investigation of individual apexes of diamond emitters by a scanning atom probe: J. Vac. Sci. Technol. B, 16, pp. 836-840 (1998).

D) Japanese Patent Application Publication No. 1995-43373.

The differences between the above described prior art references and the present invention are explained hereafter.

In the above described references, a fairly long time is taken to perform cleaning of the probe tip in each TOF measurement because only one probe is utilized Therefore, under the ordinary circumstances of the operation, the uncertainty in the chemical element identification, for an example, at 512×512 points is unavoidable because of the variation of the observation spot due to a thermal drift, and the uncertainty in the mapping of the chemical element is also unavoidable because of the residual sample of the previous measurement. In view of these problems of the prior arts, 512 cantilevers with a probe, for example, are arranged on the circumference of the daisy type cantilever wheel of the present invention According to such configuration of the present invention, when samples are collected from 512×512 sampling spots, the sample collection of 512 points in a line is possible by only one turn of the daisy type cantilever wheel. Further, it is simultaneously possible to spend enough time on the identification of TOF and cleaning of the probe tip. It is thereby possible to perform high speed mapping of the chemical element and chemical composition without uncertainty due to residual chemical elements or the thermal drifts. In addition, while conventional methods using X-ray measurement by means of electron beam irradiation were capable of identifying only to the extent of the volume with 1 μm$^3$ or the larger, the measurement of the present invention makes it possible to identify in principle one atom and the sampling position thereof.

More specifically, in the measuring device with a daisy type cantilever wheel according to the present invention, it is possible to sweep the position with which the probe tip comes into contact successively and collect specimens or atoms located on the different positions of a solid sample successively, by a raster scan (gradual displacement) of the solid sample in the plane of the wheel.

In addition, in the measuring device with a daisy type cantilever wheel according to the present invention, it is also possible to perform high resolution mapping of the distribution of the composition of the chemical element on the different positions of a solid sample, by means of the time of flight mass analysis and a chemical element identification of the specimens collected from the different positions of the sample.

In addition, in the measuring device with a daisy type cantilever wheel according to the present invention, it is also possible to measure the reaction, binding and the binding strength between the modifier materials fixed on the cantilever or the probe and the samples adhered to the cantilever or the probe as variation of the mechanical properties of the cantilever and/or as variation of the optical properties of the cantilever surface.

In this case, set samples are not limited to two kinds. Many kinds of samples can be set and these samples interacting with each other can be also detected.

More specifically, the words, which are consistently represented as "sample" and "modifier material" in the present invention can be replaced to a kind of nano reaction sites or nano test tubes comprising cantilevers and probes, and the reaction, the binding or the like between nano reaction sites can be detected as the variation of the characteristic properties or the optical properties of the cantilever. In addition, it is possible to rank the binding strength between the sample and the modifier material by the centrifugal force brought about by the rotation caused by a rotational mean of a disk-like base plate with a cantilever array, by using a method to remove the excess material adhered to the cantilever, that is, a function to cleave intentionally weak bonds by a centrifugal force. In addition, it is possible to mix more than three kinds of materials on the cantilever and observe the situation.

With regard to the optical measuring head and the measurement system mentioned in the present invention, those disclosed in the above mentioned prior art patent documents 1 and 3 proposed by the present inventor can be used.

The present invention is not limited within the above embodiments, and various modifications are possible according to the object of the present invention, which should not be excluded from the scope of the present invention.

The following effects are expected from the present invention.

(A) Modifications of cantilevers and measurement therewith are realized by the rotation of the daisy type cantilever wheel without a large scale scanning of a measuring head and a modification head required to move with highest relative speed.

(B) Film formation and surface modification are possible by spin coating using the rotation of a daisy type cantilever wheel.

(C) The binding force between a sample (a target material) and a modifier material can be detected by operating the centrifugal force brought about by the rotation of a daisy type cantilever wheel.

(D) Samples which are not bound with the modifier materials can be dispersed and removed from the cantilever by using the centrifugal force brought about by the rotation of a daisy type cantilever wheel.

(E) Detection of different samples corresponding to each frequency band is possible by measuring a plurality of cantilever set with different characteristic frequency band.

(F) As shows above, the modification of the cantilever, the introduction of samples, the removal of the materials which are not required to be measured, the measurement classified by the strength of binding forces, and the measurement of the characteristics of the cantilever can be easily achieved.

(G) Surface modification and film formation on the cantilever are possible, and as the result the detection of various materials becomes possible.

INDUSTRIAL APPLICABILITY

The measuring device of the present invention can be applied to, (1) the measurement of the reaction of a pathogen with various drugs and the identification of a pathogen; (2) a device which is capable of discriminating instantaneously the administration routine for MRSA (methicillin resistant staphylococcus aureus), (3) a device to realize a micro biomembrane in the loop of a loop type cantilever; (4) various types of material sensors; and (5) a ultraprecision machining device which can be used for the atomic order cleaning.

The invention claimed is:

1. A measuring device with a cantilever wheel comprising:
   (a) a disk-shaped base plate;
   (b) a cantilever array with cantilevers positioned so that cantilever's longitudinal axes are arranged approximately in the radial direction of the disk-shaped base plate;
   (c) a rotational means of the disk-shaped base plate on which the cantilever array is arranged;
   (d) a positioning device of the cantilever array;
   (e) an optical measuring head arranged in a position corresponding to the cantilever array for measuring movement of the cantilever; whereby
   (f) the variations in the vibration frequency and/or the vibration amplitude of the cantilevers are successively detected according to the rotation of the disk-shaped base plate.

2. The measuring device with a cantilever wheel according to claim 1, wherein an excess material adhered to the cantilever is removed by using the centrifugal force brought about by the rotation of the rotational means.

3. The measuring device with a cantilever wheel according to claim 1 further comprising a device for fixing a modifier material on the cantilever.

4. The measuring device with a cantilever wheel according to claim 3, wherein the device for fixing a modifier material is positioned with respect to the rotating cantilever array, whereby the cantilever is successively modified according to the rotation of the disk-shaped base plate.

5. The measuring device with a cantilever wheel according to claim 3, wherein the device for fixing a modifier material is a dropping device of the modifier material.

6. The measuring device with a cantilever wheel according to claim 3, wherein a modification head of the device for fixing a modifier material is an inkjet printer.

7. The measuring device with a cantilever wheel according to claim 3, wherein a modification head of the device for fixing a modifier material is a modified cantilever.

8. The measuring device with a cantilever wheel according to claim 3, wherein a modification head of the device for fixing a modifier material is a device for the deposition of a gaseous material in the atmosphere induced by an electron beam.

9. The measuring device with a cantilever wheel according to claim 1, wherein the cantilever is coated in the longitudinal direction thereof with dropped or sprayed modifier material on the disk-shaped base plate and the cantilever by using the centrifugal force brought about by the rotation of the disk-shaped base plate.

10. The measuring device with a cantilever wheel according to claim 3, wherein the device for fixing a modifier material is equipped with a feeder of a modifier material arranged on the disk-shaped base plate and a guiding groove connecting the feeder of a modifier material with the cantilever array.

11. The measuring device with a cantilever wheel according to claim 10, wherein a plurality of the feeders of a modifier material are arranged and a same or a different modifier material is set in each of the plurality of the feeders of a modifier material, whereby a same or different modification is made to each of the plurality of cantilevers.

12. The measuring device with a cantilever wheel according to claim 11, wherein the modifier material is transferred to the tip of the cantilever by using the centrifugal force brought about by the rotation of the disk-shaped base plate.

13. The measuring device with a cantilever wheel according to claim 11, wherein the modifier material is led to a particular cantilever by a capillary means or an electrowetting means in the guiding groove.

14. The measuring device with a cantilever wheel according to claim 4 comprising:
   a displacement device to displace the cantilever array in upper and lower directions, and
   a table at which the modifier material is arranged and with which the tip of the cantilever comes into contact according to the rotation of the disk-shaped base plate.

15. The measuring device with a cantilever wheel according to claim 1 further comprising a displacement device to displace the cantilever array in upper and lower directions, whereby the probe tip of the cantilever comes into contact with a specified position of a set sample successively to collect the material on the surface of the sample.

16. The measuring device with a cantilever wheel according to claims 14 or 15, wherein the displacement device is comprised of a cam.

17. The measuring device with a cantilever wheel according to claims 14 or 15, wherein the displacement device includes an optical heating element.

18. The measuring device with a cantilever wheel according to claims 14 or 15, wherein the displacement device includes an electric current heating element.

19. The measuring device with a cantilever wheel according to claims 14 or 15, wherein the displacement device includes an electrostatic force element.

20. The measuring device with a cantilever wheel according to claim 15, wherein the quantity of the material collected from the surface of the sample is a very small amount ranging from one atom or one molecule to a few picograms.

21. The measuring device with a cantilever wheel according to claim 20, wherein a mass analysis of the very small amount of the material collected by the probe tip of the cantilever is performed by a time of flight analysis.

22. The measuring device with a cantilever wheel according to claim 20 wherein after a mass analysis of the very small amount of the material collected by the probe tip of the cantilever is performed by a time of flight analysis, a residual sample specimen is removed from the probe tip by applying an electric field on the probe tip, and specimen from the sample is collected again by the cleaned probe tip according to the rotation of the cantilever wheel, and the sample collection, the measurement by the time of flight analysis, and cleaning of the probe tip are repeated.

23. The measuring device with a cantilever wheel according to any one of claims 20 to 22, wherein an in-plane raster scan of a solid sample is performed, and the position with which the probe tip of the cantilever coming into contact is successively swept, and specimens and atoms located in different positions on the solid sample are successively collected.

24. The measuring device with a cantilever wheel according to claim 23, wherein a high resolution mapping of the distribution of the chemical element composition on the surface of a sample is performed by a time of flight mass analysis and chemical element identification of the specimens collected from different positions of the sample.

25. The measuring device with a cantilever wheel according to claim 1 or 3 further comprising a device for feeding a sample to the cantilever.

26. The measuring device with a cantilever wheel according to claim 25, wherein the device for feeding a sample is equipped with a feeder of a sample arranged on the disk-shaped base plate and a guiding groove connecting the feeder of a sample with the cantilever.

27. The measuring device with a cantilever wheel according to claim 26, wherein a plurality of said feeders of a sample are arranged and a same or a different sample is set in each of the plurality of the feeders of a sample, and a same or a different sample is adhered to each of the plurality of the cantilevers.

28. The measuring device with a cantilever wheel according to claim 11, wherein the sample is led to a particular cantilever by a capillary means or an electrowetting means in the guiding groove.

29. The measuring device with a cantilever wheel according to claim 1 further comprising:
   a displacement device to displace the cantilever array in upper and lower directions, and
   a table at which the sample is arranged so as to come into contact with the tip of the cantilever according to the rotation of the disk-shaped base plate.

30. The measuring device with a cantilever wheel according to claim 3, wherein the sample is detected by a selective setting of a modifier material fixed on the cantilever.

31. The measuring device with a cantilever wheel according to claim 3, wherein the cantilever array is divided into a plurality of cantilever sets with different characteristic vibrational frequency bands, and a different sample is detected at each frequency band by changing the modifier material corresponding to the frequency band.

32. The measuring device with a cantilever wheel according to claim 1 or 3, wherein the cantilever is a V-shaped cantilever.

33. The measuring device with a cantilever wheel according to claim 1 or 3, wherein the cantilever is a loop cantilever.

34. The measuring device with a cantilever wheel according to claim 33, wherein a modifier material in the form of a thin film is spread on the loop cantilever.

35. The measuring device with a cantilever wheel according to claim 34, wherein a sample is captured on the modifier material in the form of a thin film.

36. The measuring device with a cantilever wheel according to claim 10, wherein the guiding groove for a modifier material solution and the cantilever connected therewith are designed so as to form a curve in the horizontal direction, taking into account the rotational inertia of the disk-shaped base plate.

37. The measuring device with a cantilever wheel according to claim 26, wherein the guiding groove for a sample solution and the cantilever connected therewith are designed so as to form a curve in the horizontal direction, taking into account the rotational inertia of the disk-shaped base plate.

38. A measuring device with a cantilever wheel, wherein a reaction, binding and the binding strength between the modifier material fixed on the cantilever according to any one of claims 5 to 14 and a sample adhered to the cantilever are detected as the variations of the mechanical properties of the cantilever and the variations of the optical properties of the surface of the cantilever.

39. A measuring device with a cantilever wheel according to claim 1, capable of measuring a surface of a solid sample from an atomic level to an order of several nanometers, wherein the cantilever is a V-shaped cantilever or loop cantilever.

* * * * *